United States Patent
Hung

(10) Patent No.: US 9,279,537 B2
(45) Date of Patent: Mar. 8, 2016

(54) SUPPORTING APPARATUS FOR SUPPORTING A DISPLAY

(71) Applicant: Modernsolid Industrial Co., Ltd., Taichung (TW)

(72) Inventor: Chin-Jui Hung, Taichung (TW)

(73) Assignee: Modernsolid Industrial Co., Ltd., Taichung (TW)

( * ) Notice: Subject to any disclaimer, the term of this patent is extended or adjusted under 35 U.S.C. 154(b) by 0 days.

(21) Appl. No.: 14/504,037

(22) Filed: Oct. 1, 2014

(65) Prior Publication Data

US 2015/0354746 A1    Dec. 10, 2015

(30) Foreign Application Priority Data

Jun. 6, 2014   (TW) .............................. 103210029 U

(51) Int. Cl.
| | | |
|---|---|---|
| *A47F 5/00* | (2006.01) | |
| *A47F 7/00* | (2006.01) | |
| *F16M 11/00* | (2006.01) | |
| *F16M 13/00* | (2006.01) | |
| *F16M 11/18* | (2006.01) | |
| *F16M 11/04* | (2006.01) | |
| *A47B 97/00* | (2006.01) | |
| *F16M 11/14* | (2006.01) | |
| *F16M 11/24* | (2006.01) | |
| *F16M 11/42* | (2006.01) | |
| *F16M 13/02* | (2006.01) | |

(52) U.S. Cl.
CPC .............. *F16M 11/18* (2013.01); *A47B 97/001* (2013.01); *F16M 11/046* (2013.01); *F16M 11/14* (2013.01); *F16M 11/24* (2013.01); *F16M 11/425* (2013.01); *F16M 13/02* (2013.01); *A47B 2097/006* (2013.01); *F16M 2200/027* (2013.01)

(58) Field of Classification Search
CPC ....... F16M 11/10; F16M 11/24; F16M 11/04; F16M 11/28; F16M 11/046
USPC ...................................... 248/917, 919, 123.11
See application file for complete search history.

(56) References Cited

U.S. PATENT DOCUMENTS

| | | | |
|---|---|---|---|
| 6,712,008 B1 * | 3/2004 | Habenicht et al. .............. 108/96 |
| 6,874,743 B2 * | 4/2005 | Watanabe et al. .......... 248/276.1 |
| 6,994,303 B2 * | 2/2006 | Lin et al. ..................... 248/122.1 |
| 6,994,306 B1 * | 2/2006 | Sweere et al. ........... 248/295.11 |
| 7,036,787 B1 * | 5/2006 | Lin ............................... 248/676 |
| 7,413,150 B1 * | 8/2008 | Hsu ........................... 248/123.11 |
| 7,424,991 B2 * | 9/2008 | Kim et al. .................. 248/125.9 |
| 7,677,518 B2 * | 3/2010 | Chouinard et al. ........... 248/370 |
| 7,789,354 B2 * | 9/2010 | Gan et al. ................... 248/125.8 |
| 8,016,252 B2 * | 9/2011 | Su et al. ........................ 248/157 |
| 8,074,948 B2 * | 12/2011 | Zou et al. ...................... 248/157 |

(Continued)

*Primary Examiner* — Daniel J Troy
*Assistant Examiner* — Kimberley S Wright
(74) *Attorney, Agent, or Firm* — Whyte Hirschboeck Dudek S.C.

(57) ABSTRACT

A supporting apparatus for supporting a display includes: a pillar body; a limiting unit connected to the pillar body to define a limiting space; a sliding unit movable on the pillar body; a mounting unit connected fixedly to the sliding unit and including a mounting seat for mounting the display; and a torsion coil spring that has a straight portion secured fixedly to the sliding unit and a coiled portion received in the limiting space. The torsion coil spring is retractable and extendable to convert between a retracted state, where the sliding unit is adjacent to the limiting space, and an extended state. When the torsion coil spring is converted from the retracted state to the extended state, the sliding unit is moved away from the limiting space.

8 Claims, 5 Drawing Sheets

(56) References Cited

U.S. PATENT DOCUMENTS

| | | | |
|---|---|---|---|
| 8,079,554 B2* | 12/2011 | Sui et al. | 248/157 |
| 8,081,431 B2* | 12/2011 | Fan | 361/679.05 |
| 8,104,728 B2* | 1/2012 | Chen | 248/286.1 |
| 8,111,507 B2* | 2/2012 | Chou et al. | 361/679.27 |
| 8,201,782 B2* | 6/2012 | Fan | 248/125.8 |
| 8,267,360 B2* | 9/2012 | Su | 248/123.11 |
| 8,567,735 B2* | 10/2013 | Burgess et al. | 248/280.11 |
| 8,826,831 B2* | 9/2014 | Hazzard et al. | 108/50.01 |
| 8,839,723 B2* | 9/2014 | Hazzard et al. | 108/50.01 |
| 8,905,496 B2* | 12/2014 | Burgess et al. | 312/247 |
| 9,080,721 B2* | 7/2015 | Hazzard et al. | |
| 9,188,275 B2* | 11/2015 | Ergun et al. | |
| 2005/0184215 A1* | 8/2005 | Lin | 248/676 |
| 2006/0219849 A1* | 10/2006 | Chiu | 248/125.8 |
| 2007/0102600 A1* | 5/2007 | Ishizaki et al. | 248/176.3 |
| 2007/0262210 A1* | 11/2007 | Oh et al. | 248/125.1 |
| 2010/0123059 A1* | 5/2010 | Saez | 248/201 |
| 2010/0148647 A1* | 6/2010 | Burgess et al. | 312/327 |
| 2012/0119040 A1* | 5/2012 | Ergun et al. | 248/126 |
| 2012/0187056 A1* | 7/2012 | Hazzard et al. | 211/26 |
| 2012/0256069 A1* | 10/2012 | Fallows | 248/295.11 |
| 2013/0075546 A1* | 3/2013 | Peng et al. | 248/125.1 |
| 2013/0146728 A1* | 6/2013 | Ergun et al. | 248/291.1 |
| 2013/0341476 A1* | 12/2013 | Hazzard et al. | 248/231.31 |
| 2014/0034799 A1* | 2/2014 | Fallows et al. | 248/297.21 |
| 2014/0332653 A1* | 11/2014 | Hazzard et al. | 248/411 |
| 2015/0208799 A1* | 7/2015 | Ergun et al. | |
| 2015/0320202 A1* | 11/2015 | Hazzard et al. | |

* cited by examiner

SUPPORTING APPARATUS FOR SUPPORTING A DISPLAY

CROSS-REFERENCE TO RELATED APPLICATION

This application claims priority of Taiwanese Patent Application No. 103210029, filed on Jun. 6, 2014, the entire disclosure of which is hereby incorporated by reference.

FIELD OF THE INVENTION

This invention relates to a supporting apparatus, and more particularly to a supporting apparatus for supporting a display and a work unit.

BACKGROUND OF THE INVENTION

A conventional supporting apparatus for supporting a display and a work table is commonly used in hospitals. The supporting apparatus includes a pillar body that extends vertically, a sliding unit, and two mounting seats. The sliding unit includes a sliding member that is movable upwardly and downwardly on the pillar body, and a pressure cylinder that is used to maintain the sliding member at a desired position on the pillar body. The mounting seats are spaced apart from each other, are connected fixedly to the sliding member, and are configured for respectively mounting the display and the work table. Through operation of the pressure cylinder, the positions of the display and the work table can be accurately adjustable. However, the pressure cylinder is relatively expensive and therefore increases the manufacturing cost. Moreover, the work table is disposed in a horizontal position, is connected fixedly to one of the mounting seats, and cannot rotate to a vertical position for storage, thereby increasing the storage space occupied by the work table.

SUMMARY OF THE INVENTION

Therefore, the object of the present invention is to provide a supporting apparatus that can overcome at least one of the aforesaid drawbacks of the prior art.

According to this invention, a supporting apparatus is adapted for supporting a display. The supporting apparatus includes a pillar body, a limiting unit, a sliding unit, a mounting unit and a torsion coil spring. The pillar body extends in a longitudinal direction. The limiting unit is connected to the pillar body and cooperates with the pillar body to define a limiting space. The sliding unit is movable on the pillar body in the longitudinal direction. The mounting unit is connected fixedly to the sliding unit and includes a first mounting seat adapted for mounting the display thereon. The torsion coil spring has a straight portion secured fixedly to the sliding unit and a coiled portion received in the limiting space, and is retractable and extendable relative to the limiting space to convert between a retracted state, where the sliding unit is adjacent to the limiting space, and an extended state. When the torsion coil spring is converted from the retracted state to the extended state, the sliding unit is moved away from the limiting space.

BRIEF DESCRIPTION OF THE DRAWINGS

Other features and advantages of the present invention will become apparent in the following detailed description of the embodiment of this invention, with reference to the accompanying drawings, in which.

DETAILED DESCRIPTION OF THE EMBODIMENT

Figure 1:
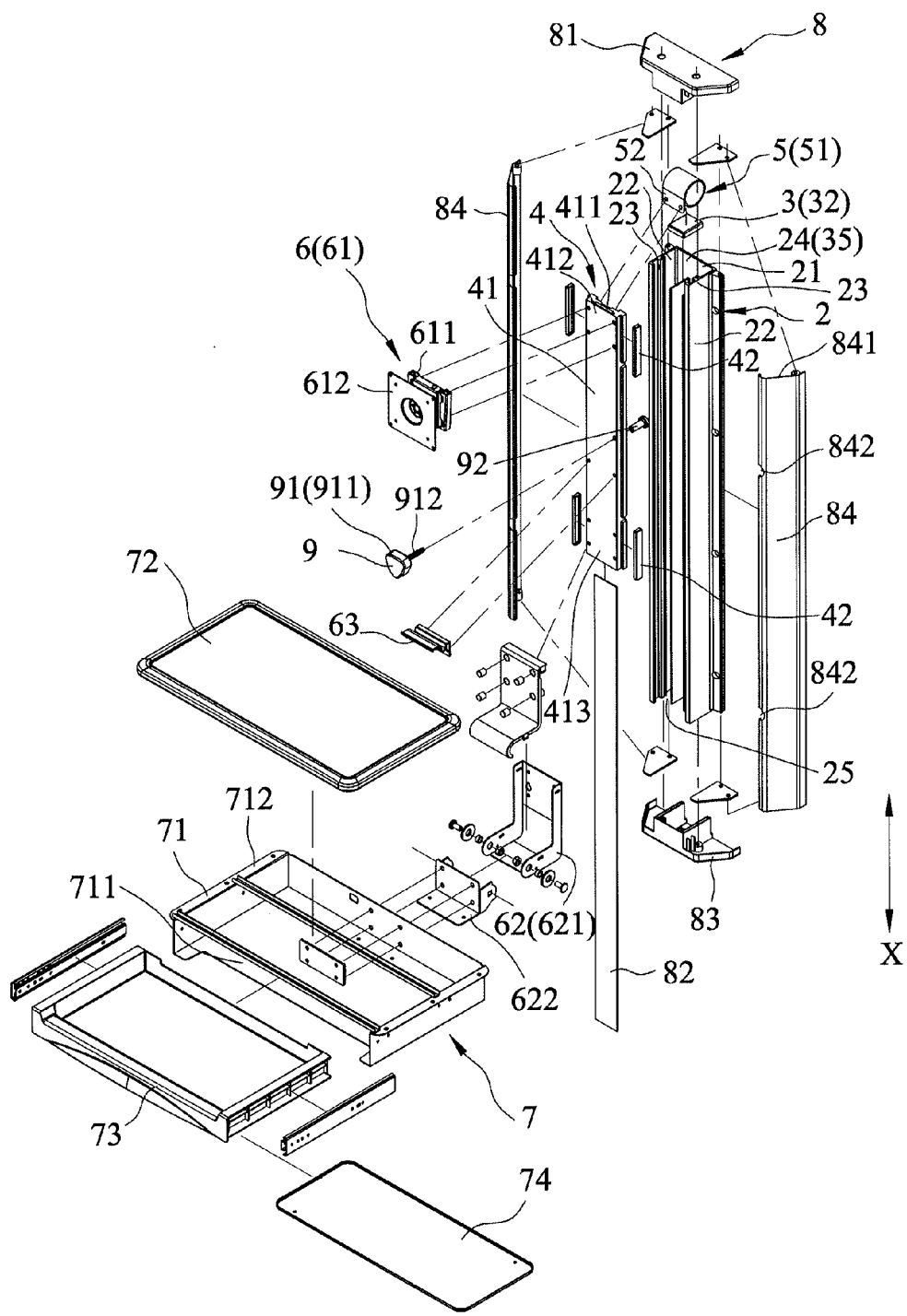
FIG. 1 is an exploded perspective view of the embodiment of a supporting apparatus according to this invention.
Figure 2:
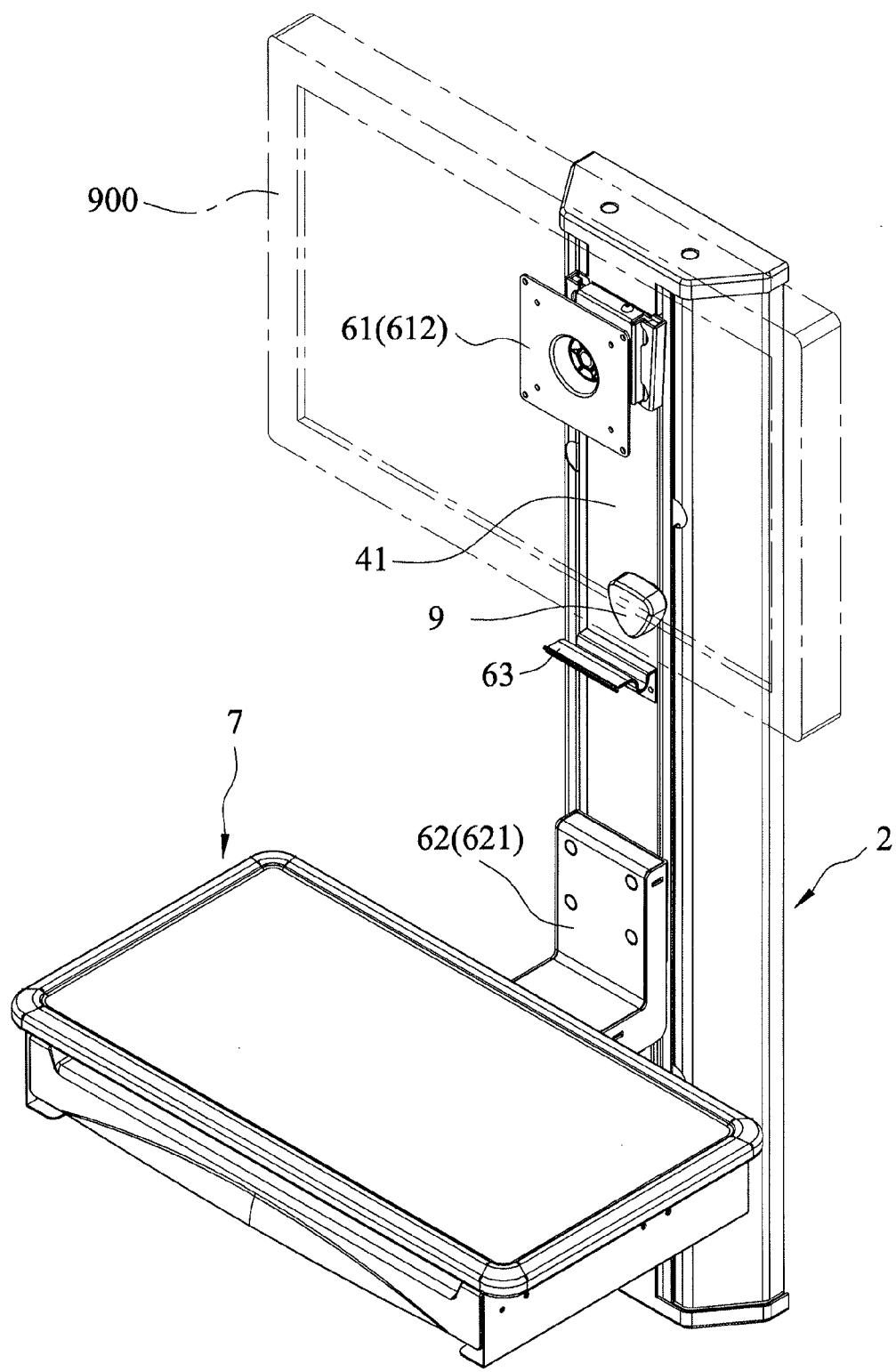
FIG. 2 is an assembled perspective view of the embodiment and a display mounted thereon.

Referring to FIGS. 1 and 2, the embodiment of a supporting apparatus adapted for supporting a display 900 according to the present invention is shown to include a pillar body 2, a limiting unit 3, a sliding unit 4, a mounting unit 6, a torsion coil spring 5, a housing unit 8, a locking member 9 and a work unit 7.

The pillar body 2 extends in a longitudinal direction (X), and includes a main wall 21 extending in the longitudinal direction (X), two extending walls 22 perpendicularly and respectively extending from opposite sides of the main wall 21 such that a cross section of the pillar body 2 traverse to the longitudinal direction (X) is configured as a U-shape. The extending walls 22 are respectively formed with two tracks 23. The main wall 21 and the extending walls 22 cooperatively define a top opening 24 and a bottom opening 25.

The housing unit 8 includes a top cap 81 and a bottom cap 83 respectively covering the top opening 24 and the bottom opening 25 of the pillar body 2, and two side covers 84 respectively mounted on the extending walls 22 of the pillar body 2. Each side cover 84 is formed with a groove 841 that is adapted for receiving a wire (not shown) therein, and a plurality of notches 842 that are spaced apart from one another and that are formed in an lateral side thereof. The notches 842 are configured to permit insertion of fingers so as to improve convenience for the users when mounting or dismounting the side covers 84.

The limiting unit 3 is connected to the pillar body 2 and cooperates with the pillar body 2 to define a limiting space 35. To be more specific, in this embodiment, the limiting unit 3 includes a limiting plate 32 that is disposed on the pillar body 2 and that is spaced apart from and disposed under the top cap 81 such that the limiting plate 32 and the top cap 81 cooperate with the main and extending walls 21, 22 of the pillar body 2 to define the limiting space 35 (see FIG. 4).

The sliding unit 4 is movable on the pillar body 2 in the longitudinal direction (X). To be specific, the extending walls 22 are respectively formed with the tracks 23 for movably mounting the sliding unit 4 thereon. In this embodiment, the sliding unit 4 includes a sliding member 41 and a plurality of sliding blocks 42. The sliding member 41 is formed with a slot 411 therethrough. Each sliding block 42 is secured on the sliding member 41 and is disposed between the sliding member 41 and a corresponding one of the tracks 23 of the extending walls 22 so as to avoid direct contact between the sliding member 41 and the tracks 23.

In this embodiment, the housing unit 8 further includes a covering plate 82 that extends through the slot 411 of the sliding member 41, that is longer than the sliding member 41 and that is clamped between the top and bottom caps 81, 83. The covering plate 82 is configured to shelter an inner space of the pillar body 2 so as to improve an aesthetic appearance of the supporting apparatus.

The locking member 9 extends through the sliding member 41 and is movable between a locking position and a release position such that, when the locking member 9 is at the locking position (see FIG. 4), an end 95 of the locking member 9 presses against the main wall 21 of the pillar body 2 such that the sliding member 41 is non-movable on the tracks 23 of the extending walls 22, when the locking member 9 is at the release position (see FIG. 5), the end 95 of the locking member 9 is spaced apart from the main wall 21 such that the sliding member 41 is movable along the tracks 23 of the extending walls 22. In this embodiment, the locking member 9 is a lock bolt unit, and includes a bolt 91 and a nut 92. The bolt 91 has a head portion 911 and a threaded rod portion 912 that extends from the head portion 911. The threaded rod portion 912 of the bolt 91 extends through the sliding member 41 and is engaged to the nut 92.

Figure 4:
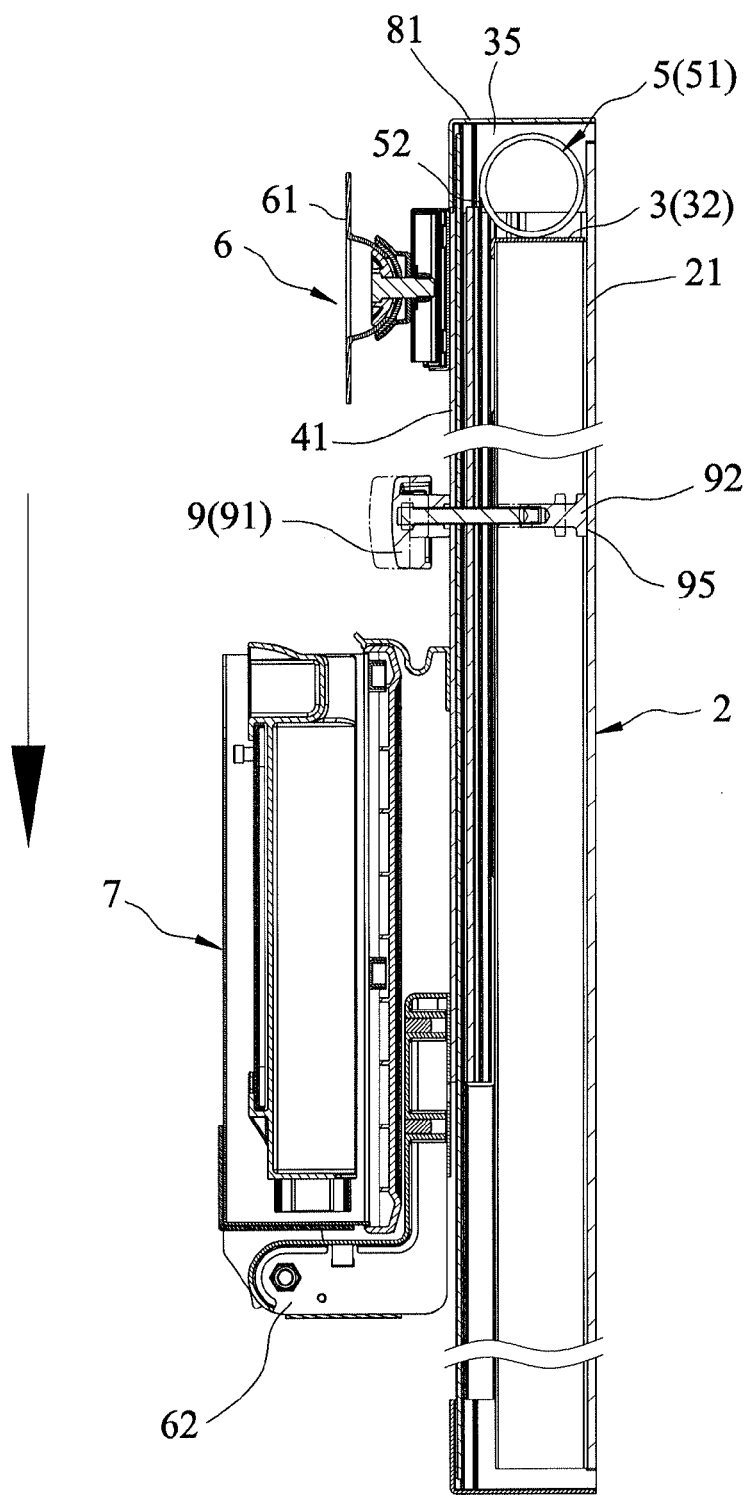
FIG. 4 is a sectional view of the embodiment, showing that a torsion coil spring is at a retracted state.
Figure 5:
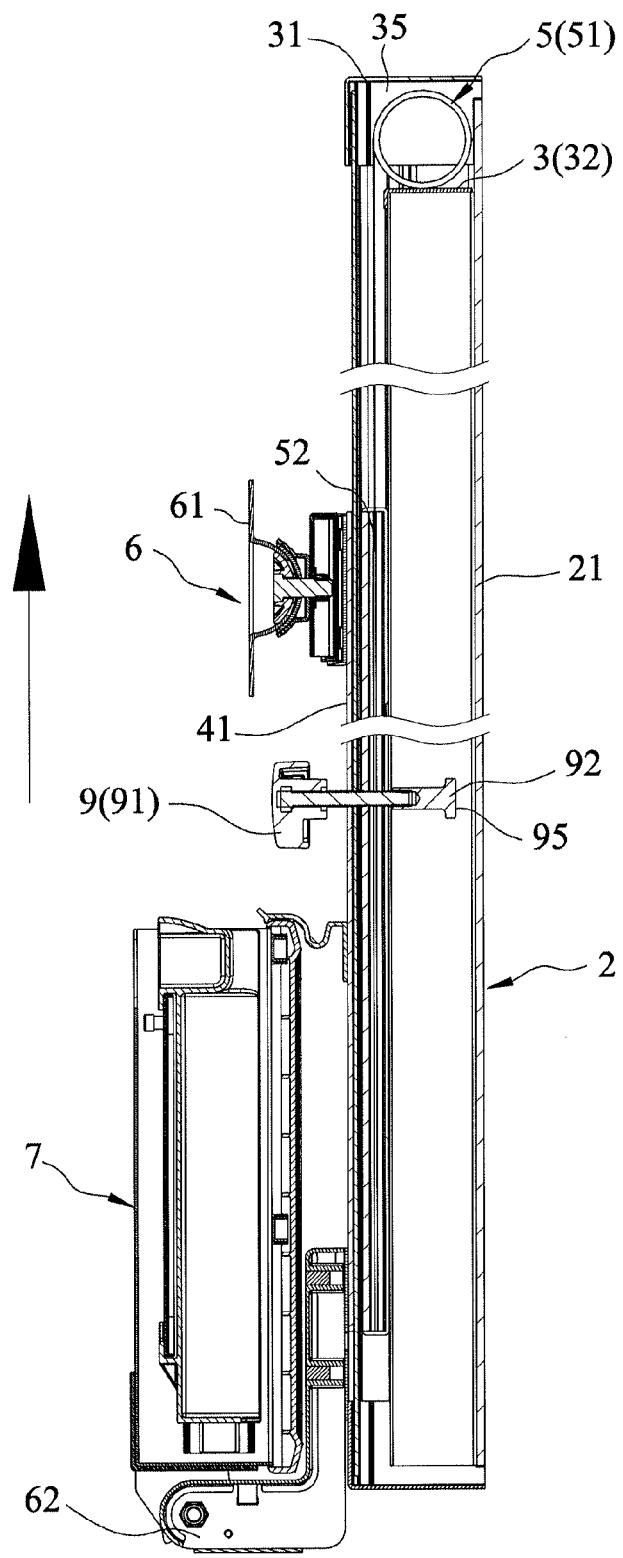
FIG. 5 is a sectional view of the embodiment, showing the torsion coil spring is at an extended state.

The torsion coil spring 5 has a straight portion 52 secured fixedly to the sliding unit 4 at an end thereof, and a coiled portion 51 connected to an opposite end of the straight portion 52 and received in the limiting space 35. The coiled portion 51 of the torsion coil spring 5 abuts against the limiting plate 32. Referring to FIGS. 4 and 5, the torsion coil spring 5 is retractable and extendable relative to the limiting space 35 to convert between a retracted state (see FIG. 4), where the sliding unit 4 is adjacent to the limiting space 35, and an extended state (see FIG. 5). When the torsion coil spring 5 is converted from the retracted state to the extended state, the sliding unit 4 is moved away from the limiting space 35. The torsion coil spring 5 tends to convert from the extended state into the retracted state.

The mounting unit 6 is connected to the sliding unit 4 and includes a first mounting seat 61 adapted for mounting the display 900 thereon. The first mounting seat 61 includes a base plate 611 that is connected fixedly to an end 412 of the sliding member 41 proximate to the top cap 81, and an adjustable plate 612 that is connected rotatably to the base plate 611 for mounting the display 900 thereon. In this embodiment, the adjustable plate 612 is connected to the base plate 611 via a universal joint. However, the connection between the base plate 611 and the adjustable plate 612 is not limited thereto.

The mounting unit 6 further includes a second mounting seat 62 disposed under the first mounting seat 61. The second mounting seat 62 includes a supporting member 621 that is connected fixedly to an opposite end 413 of the sliding member 41 distal from the top cap 81, and a rotating member 622 that is pivotally connected to the supporting member 621 and that is rotatable about a horizontal axis.

The work unit 7 is connected to the second mounting seat 62, and includes a main body 71, a work table 72, a keyboard-supporting bracket 73 and a mouse-supporting bracket 74. The main body 71 is connected fixedly to the rotating member 622 and is formed with a receiving indentation 711. The work table 72 is disposed on a top surface 712 of the main body 71. The keyboard-supporting bracket 73 is disposed within the receiving indentation 711, is movable relative to the main body 71 to project partially from the main body 71, and is adapted for supporting a keyboard (not shown) thereon. The mouse-supporting bracket 74 is disposed on the keyboard-supporting bracket 73, is movable relative to the keyboard-supporting bracket 73 to project partially from the keyboard-supporting bracket 73, and is adapted for supporting a mouse (not shown) thereon.

Figure 3:
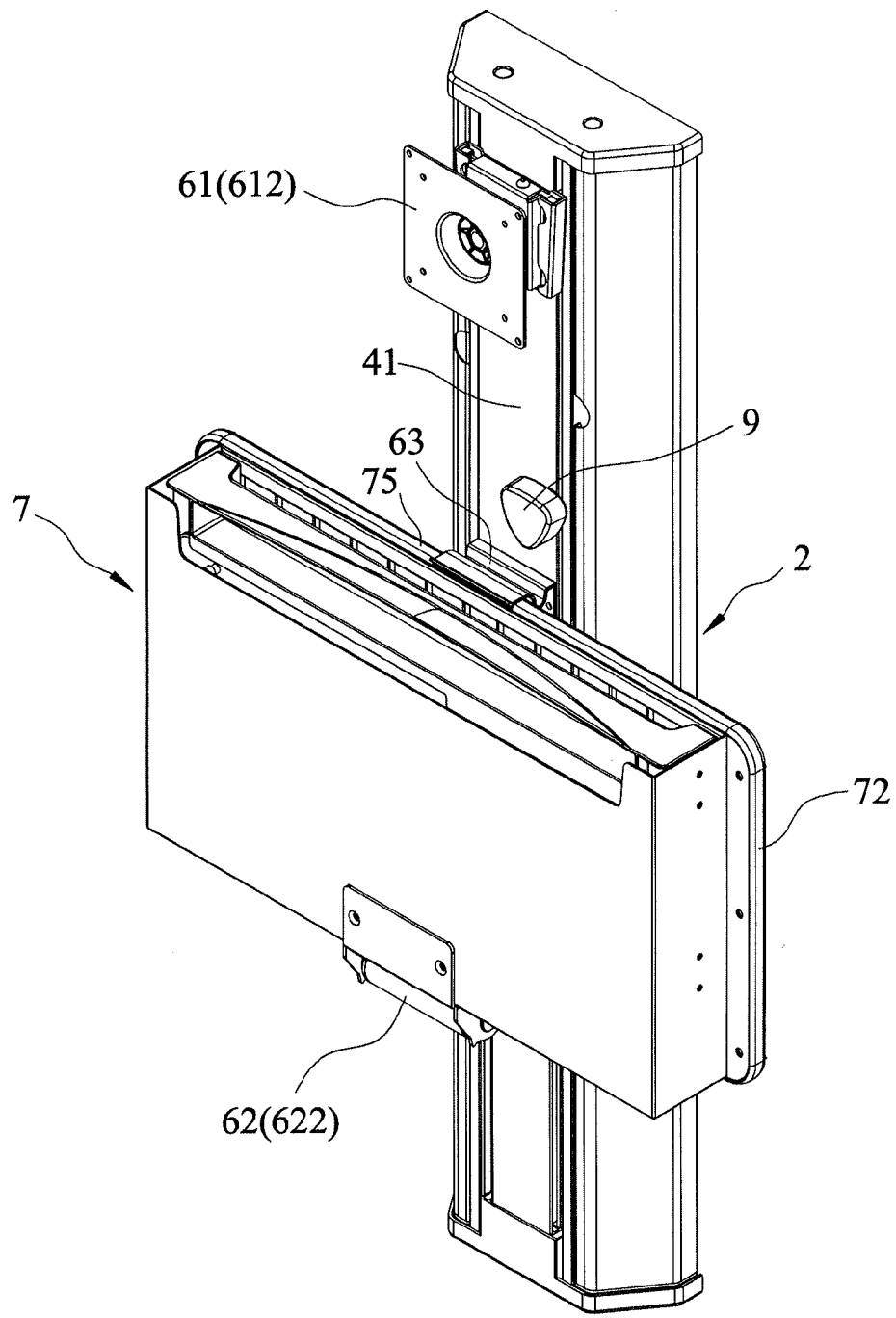
FIG. 3 is a perspective view of the embodiment, showing that a work unit is at a vertical position for storage.

Referring to FIGS. 1 to 3, the mounting unit 6 further includes a fastening member 63 that is connected fixedly to the sliding member 41 and that is disposed between the first and second mounting seats 61, 62. The work unit 7 is normally at a horizontal position (see FIG. 2), and is rotatable to a vertical position (see FIG. 3) for storage. When the work unit 7 is at the vertical position, an end 75 of the work unit 7 is snapped into the fastening member 63, so as to maintain the work unit 7 at the vertical position (see FIG. 3). As such, the storage space occupied by the work unit 7 is less than that of the aforesaid prior art.

In general, the supporting apparatus is used in a working state and is stored in a storage state.

When the supporting apparatus is in the storage state, the torsion coil spring 5 is at the retracted state, the locking member 9 is at the locking position, the work unit 7 is at the vertical position, and the sliding member 41 is adjacent to the limiting space 35.

When conversion of the supporting apparatus from the storage state to the working state is desired, the locking member 9 is first moved from the locking position to the release position so that the sliding member 41 is movable along the tracks 23 of the extending walls 22. The sliding member 41 is then pulled downwardly by an external force to move away from the limiting space 35 to a desired position. Meanwhile, the torsion coil spring 5 is driven by the sliding member 41 to convert from the retracted state to the extended state. The locking member 9 is then moved from the release position back to the locking position so as to maintain the sliding member 41 at the desired position. Finally, the work unit 7 is rotated from the vertical position to the horizontal position.

On the other hand, when converting the supporting apparatus from the working state back to the storage state, the work unit 7 is first rotated from the horizontal position to the vertical position. The locking member 9 is then moved from the locking position to the release position. The restoring force provided by the torsion coil spring 5 thus drives the torsion coil spring 5 to convert from the extended state to the retracted state and drives the sliding member 41 to move upwardly to an original position adjacent to the limiting space 35. The locking member 9 is finally moved from the release position back to the locking position so as to maintain the sliding member 41 at the original position.

To conclude, the supporting apparatus of this invention is advantageous for the following reasons:

(1) By using the torsion coil spring 5 to replace the pressure cylinder mentioned in the prior art, the manufacturing cost is significantly reduced.

(2) The work unit 7 can be rotated to the vertical position for storage via the rotating member 622 of the second mounting seat 62, thereby reducing the storage space occupied by the work unit 7.

(3) Through operation of the locking member 9, the users are allowed to adjust the sliding member 41 to in any desired position on the pillar body 2 to meet actual requirements.

(4) Since the adjustable plate 612 of the first mounting seat 61 can be rotated relative to the base plate 611, the display 900 mounted on the adjustable plate 612 can be adjusted to a desired view angle based on the users' need.

(5) The sliding blocks 42 of the sliding unit 4 reduce the frictional force between the sliding member 41 and the tracks 23 when the sliding member 41 moves on the pillar body 2, and thereby prolonging the service life of the supporting apparatus of this invention.

While the present invention has been described in connection with what is considered the most practical embodiment, it is understood that this invention is not limited to the disclosed embodiment but is intended to cover various arrangements included within the spirit and scope of the broadest interpretation and equivalent arrangements.

What is claimed is:

1. A supporting apparatus adapted for supporting a display, comprising:
a pillar body that extends in a longitudinal direction;
a limiting unit that is connected to said pillar body and that cooperates with said pillar body to define a limiting space;
a sliding unit that is movable on said pillar body in the longitudinal direction;
a mounting unit that is connected to said sliding unit and that includes a first mounting seat adapted for mounting the display thereon;
a torsion coil spring that has a straight portion secured fixedly to said sliding unit and a coiled portion received in said limiting space, and that is retractable and extendable relative to said limiting space to convert between a retracted state, where said sliding unit is adjacent to said limiting space, and an extended state, wherein when said torsion coil spring is converted from said retracted state to said extended state, said sliding unit is moved away from said limiting space; and
wherein said pillar body includes a main wall extending in the longitudinal direction, two extending walls perpendicularly and respectively extending from opposite sides of said main wall such that a cross section of said pillar body traverse to the longitudinal direction is configured as a U-shape;
wherein said extending walls are respectively formed with two tracks for movably mounting said sliding unit thereon;
wherein said main wall and said extending walls cooperatively define a top opening and a bottom opening;
wherein said sliding unit includes a sliding member and a plurality of sliding blocks each being secured on said sliding member and being disposed between said sliding member and a corresponding one of said tracks of said extending walls so as to avoid direct contact between said sliding member and said tracks;
wherein said mounting unit further includes a second mounting seat including a supporting member that is connected fixedly to an opposite end of said sliding member distal from said top cap, and a rotating member that is pivotally connected to said supporting member; and
wherein said supporting apparatus is adapted for supporting a keyboard and a mouse thereon, and further comprises a work unit that is connected to said second mounting seat and that includes
a main body connected fixedly to said rotating member and formed with a receiving indentation,
a work table disposed on a top surface of said main body,
a keyboard-supporting bracket disposed within said receiving indentation, movable relative to said main body to project partially from said main body, and adapted for supporting the keyboard thereon, and
a mouse-supporting bracket disposed on said keyboard-supporting bracket, movable relative to said keyboard-supporting bracket to project partially from said keyboard-supporting bracket, and adapted for supporting the mouse thereon.

2. The supporting apparatus as claimed in claim 1, further comprising a housing unit that includes a top cap and a bottom cap respectively covering said top opening and said bottom opening of said pillar body.

3. The supporting apparatus as claimed in claim 2, wherein said limiting unit includes a limiting plate that is disposed on said pillar body and that is spaced apart from and disposed under said top cap such that said limiting plate and said top cap cooperate with said pillar body to define said limiting space, said coiled portion of said torsion coil spring abutting against said limiting plate.

4. The supporting apparatus as claimed in claim 2, which is adapted for receiving at least one wire therein, wherein said housing unit further includes two side covers that are respectively mounted on said extending walls of said pillar body, each of said side covers being formed with a groove adapted for receiving the wire, and a plurality of notches that are spaced apart from one another and that are formed in an lateral side thereof.

5. The supporting apparatus as claimed in claim 1, further comprising a locking member that extends through said sliding member and that is movable between a locking position and a release position such that, when said locking member is at the locking position, said locking member has an end pressing against said main wall of said pillar body such that said sliding member is non-movable on said tracks of said extending walls, when said locking member is at the release position, said end of said locking member is spaced apart from said main wall such that said sliding member is movable along said tracks of said extending walls.

6. The supporting apparatus as claimed in claim 1, wherein:
said sliding member is formed with a slot therethrough; and
said supporting apparatus further comprises a housing unit that includes a top cap and a bottom cap respectively covering said top opening and said bottom opening of said pillar body, and a covering plate that extends through said slot of said sliding member, that is longer than said sliding member and that is clamped between said top and bottom caps.

7. The supporting apparatus as claimed in claim 1, wherein said first mounting seat of said mounting unit includes a base plate that is connected fixedly to an end of said sliding member proximate to said top cap, and an adjustable plate that is connected rotatably to said base plate for mounting the display thereon.

8. The supporting apparatus as claimed in claim 1, wherein:
said work unit is normally at a horizontal position, and is rotatable to a vertical position for storage;
said mounting unit further includes a fastening member that is connected fixedly to said sliding member and that is disposed between said first and second mounting seats; and
when said work unit is at the vertical position, an end of said work unit is snapped into said fastening member, so as to maintain said work unit at the vertical position.

* * * * *